United States Patent [19]
Kimball

[11] Patent Number: 6,028,984
[45] Date of Patent: Feb. 22, 2000

[54] METHOD AND APPARATUS FOR MAKING A SEAMLESS NETWORK CONNECTION

[75] Inventor: Robert H. Kimball, San Diego, Calif.

[73] Assignee: Qualcomm, Incorporated, San Diego, Calif.

[21] Appl. No.: 08/694,052

[22] Filed: Aug. 8, 1996

[51] Int. Cl.[7] ................................................. G06F 13/00
[52] U.S. Cl. .................... 395/200.79; 370/401; 370/405; 370/408
[58] Field of Search ................................ 395/200.2, 311, 395/200.48, 200.68, 200.69, 200.79; 370/401, 405, 408

[56] References Cited

U.S. PATENT DOCUMENTS

| | | | |
|---|---|---|---|
| 5,321,695 | 6/1994 | Faulk et al. | 370/401 |
| 5,337,309 | 8/1994 | Faulk et al. | 370/405 |
| 5,355,365 | 10/1994 | Bhat et al. | 370/85.13 |
| 5,377,327 | 12/1994 | Jain et al. | 395/200 |
| 5,532,939 | 7/1996 | Psinakis et al. | 395/200.68 |
| 5,572,528 | 11/1996 | Shuen | 370/85.13 |
| 5,654,959 | 8/1997 | Baker et al. | 370/331 |
| 5,745,702 | 4/1998 | Morozumi | 395/200.79 |

OTHER PUBLICATIONS

Imtiaz Patel, "Wireless LAN Card with a Wide Range". PC User, pp. 69.

*Primary Examiner*—Frank J. Asta
*Assistant Examiner*—Ivan C. Pierce, III
*Attorney, Agent, or Firm*—Russell B. Miller; Bruce W. Greenhaus; Charles D. Brown

[57] ABSTRACT

A computer is coupled to a switching subsystem that connects the computer to either a network interface device or a wireless modem. The network interface device sends a status signal to the switch indicating whether the device is connected to the network. If a network connection is made, the network interface device is used to communicate over the network. If the status indication is that the network interface device is not connected, the switch automatically connects the wireless modem to the computer so that the computer can communicate with the network over a radio channel. In a preferred embodiment, the switching subsystem reconnects to the network port when it again becomes operable.

19 Claims, 3 Drawing Sheets

METHOD AND APPARATUS FOR MAKING A SEAMLESS NETWORK CONNECTION

BACKGROUND OF THE INVENTION

I. Field of the Invention

The present invention relates to computer networks. More particularly, the present invention relates to a novel and improved method and apparatus for network connection.

II. Description of the Related Art

As computers have gotten smaller and become increasingly more portable, they have been taken out of the home, office, and school to various on the road assignments. In order to remain in contact with other computers, such as a computer network, or to communicate e-mail to other computers, the portable computers must use modems (modulator/demodulators). The modem translates the digital signals from the computer to analog signals for transmission and demodulates the received analog signal into a digital form readable by the computer.

In order to be truly portable, however, a computer must be able to keep in contact with other computers without having to be physically connected to a telephone line. This is accomplished by connecting the computer modem to a wireless, radio frequency (RF) transceiver.

One form of such a wireless transceiver is a cellular radiotelephone. A number of competing cellular systems are now available. These include the analog advanced mobile phone system (AMPS), time division multiple access (TDMA), and code division multiple access (CDMA), the last two systems being digital systems. CDMA provides a distinct advantage in cellular data communications.

When the computer is used in an office, it typically uses a direct hardwired network connection, such as an Ethernet connection, to couple to a computer network. If the computer has been used in the field and is now being connected to the hardwired connection (e.g., Ethernet), the computer must be reconfigured to access the Ethernet port instead of the serial port to the modem.

If the computer is being taken off the Ethernet direct connection to be used with the wireless modem, such as when connection to the Ethernet is lost, or a portable computer is disconnected from the Ethernet, the computer must be reconfigured to access the serial port. This reconfiguration, depending on the computer and the network, can be a complicated, time consuming process which may involve changes in hardware and software. There is a resulting need for a smooth, easy, seamless way to connect a computer to a network both in a fixed location and when the computer becomes portable without requiring a complicated reconfiguration of the computer. Additionally, there is a need for a seamless way for a computer to automatically detect network link wellness and responsively switch to an operative network link.

SUMMARY OF THE INVENTION

The present invention is a novel and improved system and method for providing a seamless computer network connection. The method connects a computer that has both a first network connection (e.g., wireless modem) and a second network connection (e.g., a network port for direct hard-wired connection) to a computer network such as an Ethernet network. The apparatus and method determine if the network port is connected to the computer network. If the network is connected, a switch connects the computer to the network port. If the network is not connected, the computer is automatically switched to the wireless modem which then keeps the computer in contact with the network. Upon reconnection of the hard-wired connection, the computer is automatically switched back to the hard-wired network port. In one embodiment, the wireless modem can be activated by the switch if the modem is selected to be used. The default priority port can be user selected, or default set-up.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The network connection method and apparatus of the present invention provides a seamless network connection for a computer. The computer can be used in both a fixed office environment, connected directly to the computer network, and roaming in a portable mode using a wireless modem to connect to the network. In changing modes, the user of the computer does not have to reconfigure the computer to connect to the network. The reconfiguration is performed automatically in a manner that is transparent to the computer user. In the preferred embodiment of the present invention, the Ethernet network is used. Alternate embodiments, however, can use other types of networks, such as Appletalk or a token ring network.

Figure 1:
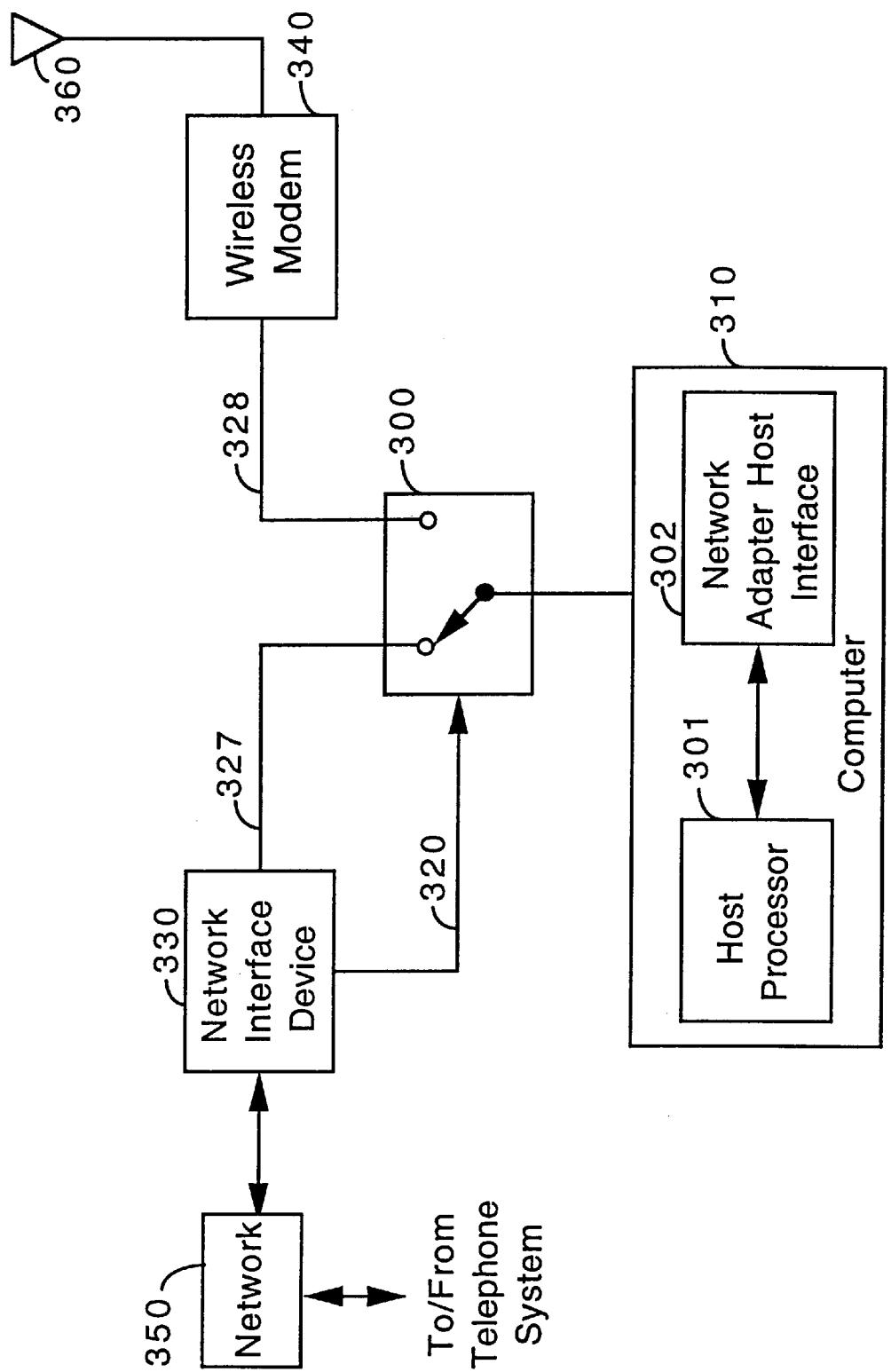
FIG. 1 is a block diagram of the network interface of the present invention.

The network connection apparatus of the present invention is illustrated in FIG. 1. The computer 310 has a host processor 301 that interfaces with a network adapter host interface 302. In the preferred embodiment, this host interface 302 is a software device driver interface. Alternate embodiments may use other types of interfaces. The computer 310 can be any type computer such as an APPLE MACINTOSH or an IBM compatible. The processor 301 can be any type microprocessor as are known in the art such as a series 680X0 manufactured by MOTOROLA.

The computer 310 is coupled to the switching subsystem 300. The switching subsystem 300 provides the connection between either the network interface device 330 or the wireless modem 340. The network interface device 330 comprises interface hardware with any necessary software drivers that translate data from the computer into the appropriate network protocol, depending on the network being used. Ethernet conversion and protocol is well known in the art.

The wireless modem 340 is a digital radiotelephone modem in the preferred embodiment. This modem modulates the input digital data and radiates it from the antenna 360. Received data is demodulated by the modem 340 into a digital form usable by the computer 310.

When the apparatus of the present invention is first powered up, the preferred default state is for the switching subsystem 300 to connect the computer 310 to the primary network interface device 330. This is considered the primary connection since it is typically the preferred choice (a high speed, low cost, direct connection). When connected to the network interface device 330, the computer communicates through the switching subsystem 300 over the data bus 327 connected between the switching subsystem 300 and the network interface device 330.

In the preferred embodiment, a status line 320 connects the network interface device 330 to the switching subsystem 300 to enable the switching subsystem 300 to determine if the network interface device 330 is connected to the network 350. Logic in the network interface device 330 determines if the device 330 is connected to the network 350 by looking for traffic. If traffic is present on the network 350, the status line 320 is brought to a logic high level to inform the switch that the network 350 is connected. If traffic is not found on the network 350, the status line 320 is left low to instruct the switch that the network interface device 330 is not connected to the network 350. Also, in the preferred embodiment, the network interface device 330 senses not only whether or not it is physically connected to the network 350, but also the "health" of the network 350, i.e. whether data packets may be successfully transmitted and received. Thus, the network interface device 330 determines whether it is "connected" to the network 350 in the broadest functional sense.

An alternate embodiment eliminates the status line 320, by virtue of the network interface device 330 sending a control word over the data bus 327 to the switching subsystem 300. This control word tells the switching subsystem 300 whether or not the network interface device 330 is connected to the network 350.

In any event, if the switching subsystem 300 determines that network connectivity via the switching apparatus of the present invention is not connected to the network 350, the switching subsystem 300 switches to couple the computer 310 to a secondary network interface device, such as the wireless modem 340. When the wireless modem is connected, the data to and from the modem 340 is connected through a second data bus 328.

The wireless modem 340 then communicates with a local cellular radiotelephone system. The radiotelephone system is connected to the land-line telephone system that, in turn, is connected to the computer network 350. Thus, the wireless modem 340 enables the computer 310 to communicate with the computer network through a radio channel.

Figure 2:
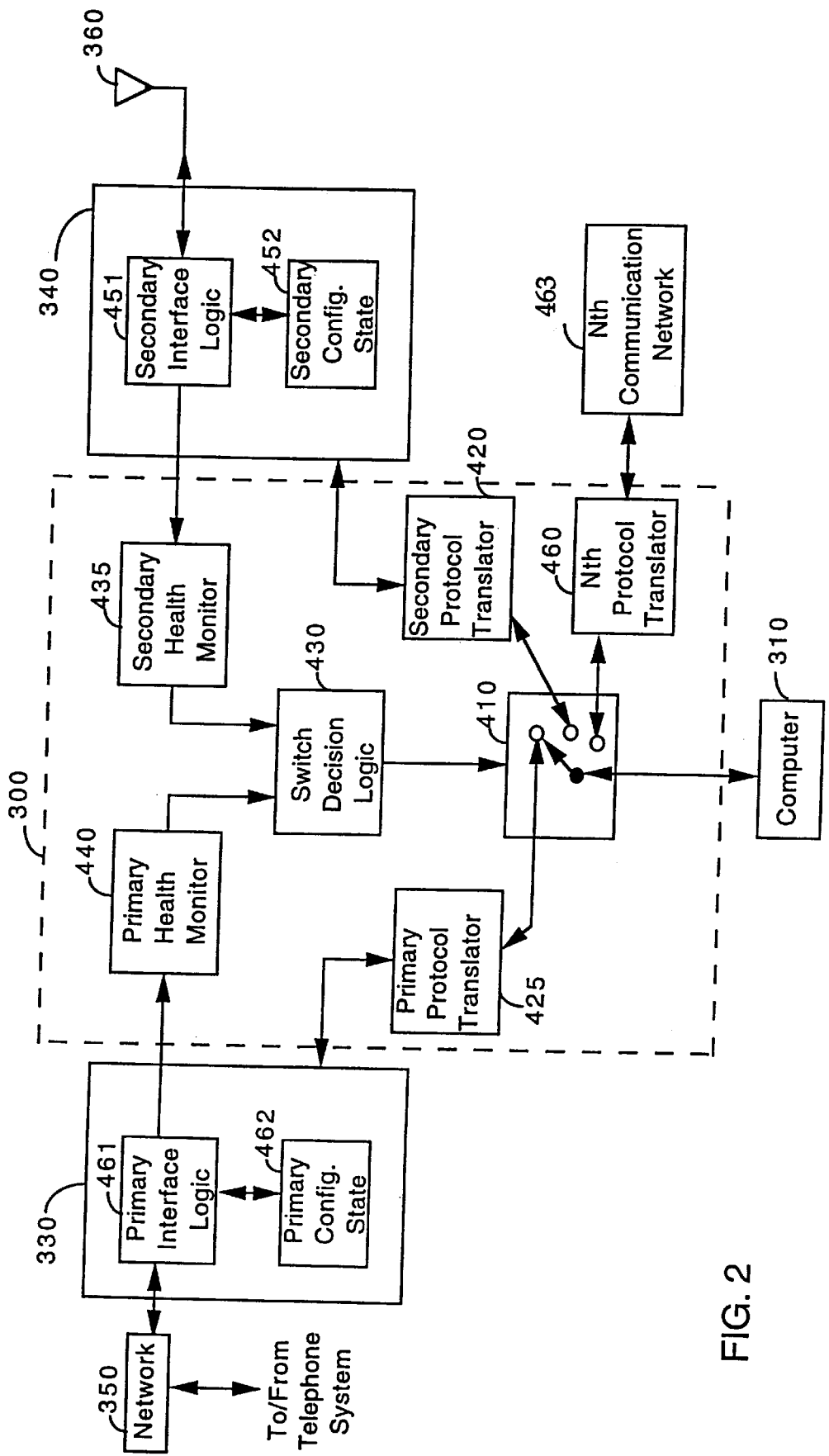
FIG. 2 is a block diagram of the switching subsystem of the present invention.

FIG. 2 illustrates an expanded block diagram of the switching subsystem 300 of the present invention. The switch 410 routes the signals between the computer 310 and the wireless modem 340 or the network interface device 330. Upon initialization, the switch decision logic 430 provides a signal to the switch 410 instructing it to connect to the primary network interface. In the preferred embodiment, the primary device is the network interface device 330. Alternate embodiments could select the wireless modem 340 as the primary (or default) device. Additionally, other embodiments allow the user to program his or her primary device selection.

Primary and secondary protocol translators 425 and 420 are coupled between the network interface device 330 and wireless modem 340 respectively. The protocol translators 420 and 425 are responsible for converting a generic command stream from the computer into a command stream for the specific destination device 330 or 340, depending on which device is selected by the switch 410. The protocol translators also translate the commands from the respective device into a language that can be interpreted by the computer. This translation enables immediate switching of desired network communication without user reconfiguration of the computer. In other words, the switching between types of communication interfaces is seamless and transparent, and automatic. In the preferred embodiment, these protocol translators 420 and 425 are look-up tables that accept a computer output command and look in the table for the corresponding command for that particular device. Alternate embodiments use other types of translators.

Primary and secondary health monitors 440 and 435 are coupled to their respective network interface 340 and 330. These monitors 435 and 440 receive health status indications from the respective interface 340 or 330 so that the switch decision logic 430 knows which network interface is actively connected (including enablement of successful transmission and reception of data packets) and to which device the switch 410 is switched.

If the network interface device 330 is selected but is not connected to the network 350, or is not operating properly, the primary health monitor 440 determines this and indicates the improper operation to the switch decision logic 430. In this case, the switch decision logic 430 would instruct the switch 410 to connect the wireless modem 340 to the computer. Alternatively, if the wireless modem 340 is selected, but is not operating properly, the secondary health monitor 435 sends this indication to the switch decision logic 430. The switch decision logic 430 then instructs the switch 410 to connect the network interface device 330 to the computer.

If the switch decision logic 430 is getting indications that both the network interface device 330 and the wireless modem 340 are not operating properly, the switch reverts to the primary position, or in an alternate embodiment, couples to yet another communications network 463 through a respective protocol translator 460.

The network interface device 330 is comprised of the primary interface logic 461 that transmits and receives the data over the bus 350. This interface also has a primary configuration state register 462. In the preferred embodiment, this register 462 stores the Ethernet hardware address.

The wireless modem 340 is comprised of the secondary interface logic 451 that transmits and receives the data from the radio channel. The wireless modem 340 also has a secondary configuration register 452 that stores the configuration commands, such as AT commands, from the computer. In the preferred embodiment, these commands are used to configure the modem 340.

Alternate embodiments, instead of using the primary and secondary health monitors 440 and 435, use command words directly from the network interface device 330 or the wireless modem 340. These commands can be interpreted by the switch decision logic 430 to determine how the switch 410 should be set.

Figure 3:
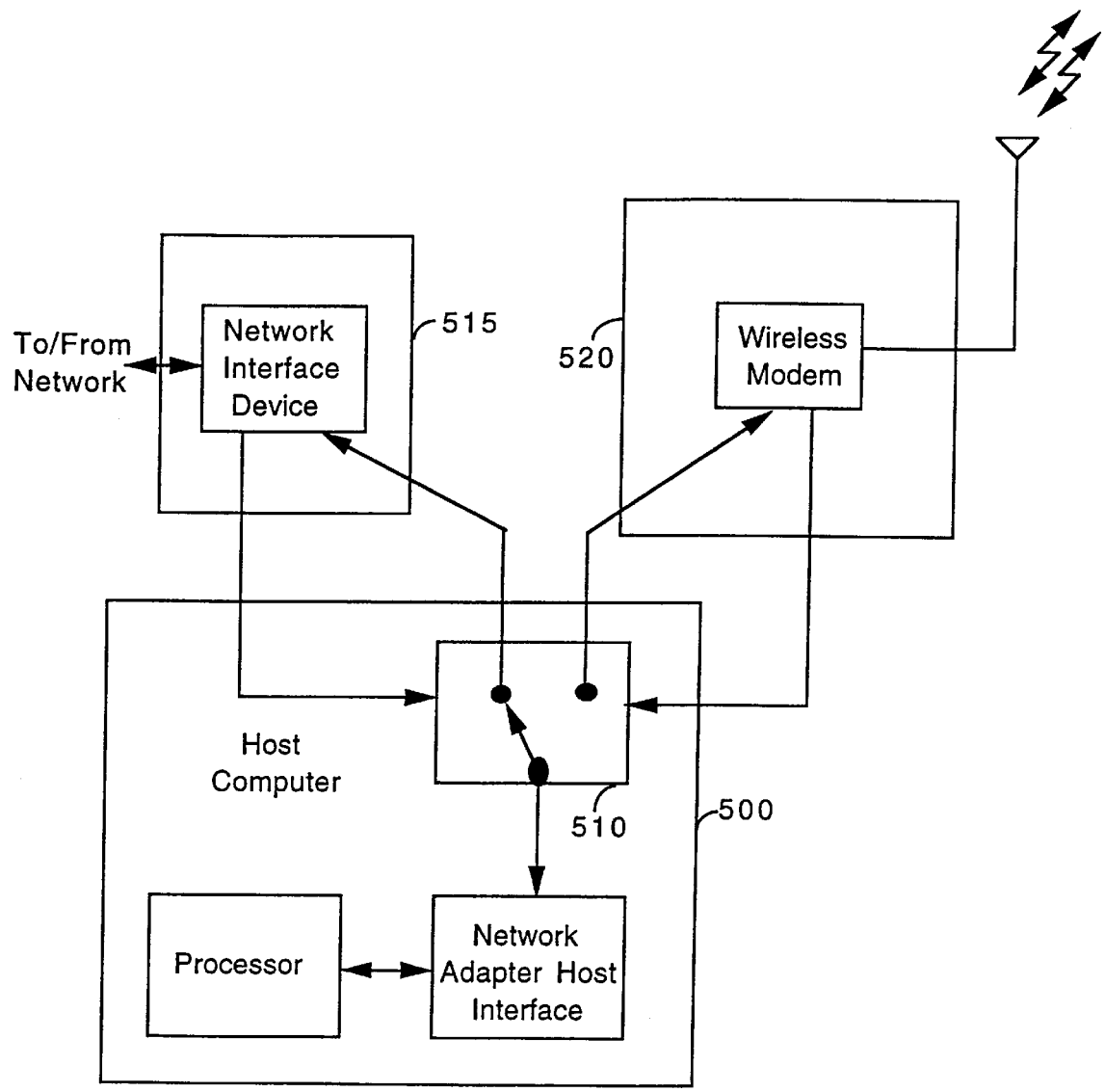
FIG. 3 is a block diagram of an alternate embodiment of the present invention.

An alternate embodiment of the present invention is illustrated in FIG. 3. This embodiment incorporates the switching function 510 into the host computer 500. This embodiment has the advantage of being able to use an off-the-shelf network interface device 515 and wireless modem 520. The switching function 510 in this embodiment is performed at the operating system or system hardware level in conjunction with software functions. In this embodiment, the switch 510 integral to the computer coordinates configuration commands to the computer to allow automatic set-up and configuration of the network communications port and protocol.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for providing a switchable network connection with a network switching apparatus having both a primary port and a secondary port, the method comprising the steps of:

determining, in said network switching apparatus, whether said primary port is connected to a computer network;

communicating data with said computer network over said primary port if said primary port is connected to said computer network;

determining, in said network switching apparatus, whether said secondary port is connected to said computer network if said primary port is not connected to said computer network; and automatically switching said data to said computer network over said secondary port only if said secondary port is connected to said computer network and said primary port is not connected to said computer network.

2. The method of claim 1 wherein said steps of determining whether said primary port is connected to said computer network and of determining whether said secondary port is connected to said computer network respectively include the step of sensing, in said network switching apparatus, whether network data is present at said primary port and said secondary port, respectively.

3. The method of claim 1 wherein said step of determining whether said primary port is connected to said computer network includes the step of determining whether communication with said computer network is successful over said primary port, and wherein said step of determining whether said secondary port is connected to said computer network includes the step of determining whether communication with said computer network is successful over said secondary port.

4. The method of claim 1, wherein one of said primary or secondary ports is a wireless modem port.

5. A method for providing a switchable computer network connection with a computer having both a wireless modem port and a network port, each of said wireless modem port and said network port for communicating a data stream over a computer network, the method comprising the steps of:

determining a network port operational status;

determining a wireless modem operational status;

automatically switching to one of the network port and the wireless modem in response to said network port operational status and said wireless modem operational status;

generating, in response to said automatically switching step, a command stream for controlling one of said wireless modem and said network port;

translating said command stream to an appropriate protocol for one of the network port and wireless modem in response to said automatically switching step; and transmitting said data stream through one of the network port and the wireless modem in response to said automatically switching step.

6. The method of claim 5 wherein said steps of determining a network port operational status and of determining a wireless modem port operational status respectively include the step of sensing, whether network data is present at said network port and said wireless modem port, respectively.

7. The method of claim 5 wherein said step of determining a network port operational status includes the step of determining whether communication with said computer network is successful over said primary port, and wherein said step of determining a wireless modem port operational status includes the step of determining whether communication with said computer network is successful over said secondary port.

8. A network switching apparatus for coupling a computer to a computer network, the apparatus comprising:

a network interface device for coupling said computer to said computer network;

a wireless modem for coupling said computer to said computer network over a radio channel;

means for determining a health status of said network interface device and said wireless modem; and a switch, coupled to said network interface device and said wireless modem, for automatically selectively coupling said computer to one of said network interface device and said wireless modem responsive to said means for determining.

9. The network switching apparatus of claim 8, further comprising a status line coupling said network interface device to said means for determining, said status line indicating when said network interface device is operably connected to the computer network.

10. The network switching apparatus of claim 8, further comprising a control line coupling said switch to said wireless modem, said control line activating said wireless modem when said status line indicates said network interface device is not connected to said computer network.

11. A network switching apparatus for coupling a computer to a computer network using one of either a network port or a wireless modem, said computer generating a data stream, said apparatus comprising:

a computer interface for coupling said computer to said apparatus;

a network port monitor, coupled to said network port, for generating a network condition signal;

a wireless modem monitor, coupled to said wireless modem, for generating a radio channel condition signal;

switch decision logic, coupled to said network port monitor and said wireless modem monitor, for generating a decision signal in response to said network condition signal and said radio channel condition signal; and a switch, coupled to said switch decision logic, said network port, said wireless modem, and said computer interface, for automatically selectively coupling one of said network port and said wireless modem to said computer interface in response to said decision signal.

12. The switching apparatus of claim 11, wherein said computer also generates a command stream, said apparatus further comprising a first protocol translator coupled between said switch and said network port, said first protocol translator converting said command stream into commands recognizable by said network port.

13. The switching apparatus of claim 12, further comprising a second protocol translator coupled between said switch and said wireless modem, said second protocol translator converting said command stream into commands recognizable by said wireless modem.

14. The switching apparatus of claim 13, further comprising a network port configuration register, coupled to said network port, for storing network port configuration information.

15. The switching apparatus of claim 14, further comprising a wireless modem configuration register, coupled to said wireless modem, for storing wireless modem configuration information.

16. The switching apparatus of claim 14, wherein said network port configuration information includes hardware addresses.

17. The switching apparatus of claim 15, wherein said wireless modem configuration information includes modem commands.

18. The switching apparatus of claim 15, wherein said network condition signal is a control word.

19. The switching apparatus of claim 18, wherein said radio channel condition signal is a control word.

* * * * *